Figure 1:
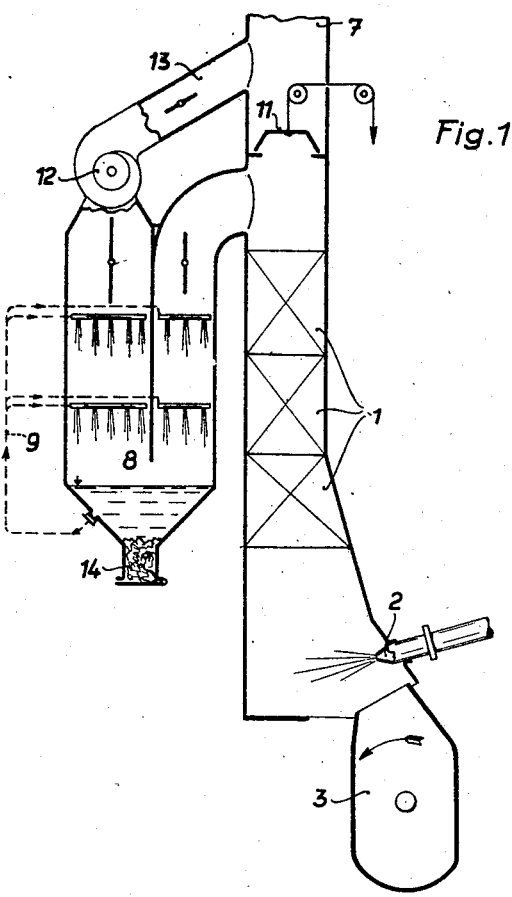

April 22, 1958

S. GUCZKY 2,831,467

APPARATUS FOR COOLING AND UTILIZING
THE HEAT OF WASTE GASES

Filed Sept. 4, 1953

Inventor:
Stefan Guczky by:
Michael S. Striker
Attorney

United States Patent Office 2,831,467
Patented Apr. 22, 1958

2,831,467
APPARATUS FOR COOLING AND UTILIZING THE HEAT OF WASTE GASES

Stefan Guczky, Vienna, Austria, assignor to Waagner-Biro Aktiengesellschaft, Vienna, Austria, an Austrian firm Application September 4, 1953, Serial No. 378,593

Claims priority, application Austria February 12, 1953

2 Claims. (Cl. 122—7)

The invention relates to an apparatus for cooling and utilizing the heat of waste gases from intermittently conducted combustion processes, more particularly of waste gases from converter plants operating on the basic or acid Bessemer process or the oxygen blast process. Previously the hot waste gases from such plants were exhausted into the open. This means mainly a waste of heat energy. The waste gases discharged into the open also have most detrimental effects (dust, dirt, chemical action and the like) in the environments of such plants, particularly when pure oxygen is used instead of air for blowing the charge. Hence, the invention has as its underlying object to render useful in a most economical manner the heat otherwise lost and at the same time to eliminate the aforesaid deleterious effects of the waste gases in the environments whereas any subsequently arranged gas cleaning plant should not be exposed to the high temperatures of the waste gases of the converter.

According to the invention said objects are achieved mainly by feeding the waste gases to a plant for cooling. Thus the waste gases are correspondingly cooled and at the same time their heat is rendered useful. According to another feature of the invention it is of advantage to operate in the intervals between the several recurring combustion periods (intermittent operation) the waste heat utilization apparatus, e. g. a waste heater boiler, by an additional heating plant (gas oil or coal firing) to protect it from detrimental cooling. It is also possible, however, to use several converter plants, one of which is operated at a time and has its waste gases fed to the waste heat utilization apparatus (boiler). In that case the waste heat boiler is heated continuously, as is necessary for an economical operation of such boilers. Finally the invention provides for conducting the heating gases after leaving the waste heat boiler through a gas cleaning plant, if desired, to discharge into the open only harmless pure gases.

With reference to the drawing, which illustrates the subject of the invention in some embodiments, only by way of example, the several processes can be explained easily.

Figure 2:
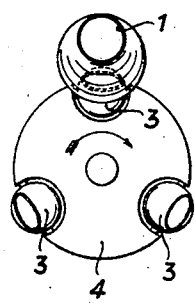
Figure 3:
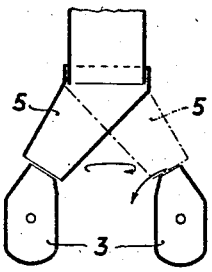

Fig. 1 shows a general arrangement. Figs. 2 and 3 represent other forms of the process. All figures are schematic.

According to Fig. 1 the waste gases are fed to the waste heat boiler 1 during the operation of the converter 3. These waste gases first flow over lining heating surfaces, then over contact heating surfaces such as compartment heating surfaces and conduit heating surfaces. Behind the waste heat boiler the heating gases pass directly into the chimney 7 if the bell 11 is open. If the heating gases are to be cleaned, the bell 11 is kept closed. Then the heating gases flow through a gas cleaning plant 8 and are passed to the chimney 7 as pure gases through the fan 12 and pipe 13. To keep the liquid requirements down in a gas washing plant, the liquid not evaporated is recycled in that plant; this is indicated by the dash line 9. The impurities extracted from the gases may be discharged at 14.

During the time of charging and discharging the waste heat boiler is inoperative. However, a utilization of the heat of the waste gases is provided for at least during the time of operation of the converter.

As is further apparent from Fig. 1, an additional heating plant 2 is provided at the entrance of the waste heat boiler 1. During the inoperative period of the converter that heating plant can supply heat instead of the converter to the waste heat utilization plant so that the latter can be operated continuously in a safe and economical manner. As soon as the converter starts blowing again, the additional heating plant is shut off.

A continuous operation of the waste heat boiler 1 may be maintained also by the use of several, e. g., three converter plants 3, as is shown diagrammatically in Fig. 2. During the operating period of one such converter, which heats the waste heat boiler 1, the previously operated second converter is discharged and the third converter is charged. After the blowing period of the first-mentioned converter has been terminated, the converter which has been charged in the meantime is moved below the waste heat boiler, etc.

Even where the converters 3 are not movable, the process can be performed similarly, as is shown in Fig. 3, according to which the waste heat utilization plant 1 is continuously operated at any time in spite of the intermittent operation of the converter plants. According to Fig. 3 this is achieved by connecting by means of a movable conduit 5 the converter in operation at a time with the waste heat boiler 1.

Obviously several converter plants as illustrated in Figs. 2 to 3 may be operated in combination with an additional heating plant, to be able to fill any intervals still occurring.

The invention is not restricted to the embodiments shown by way of example. The movable converter plants need not be moved in a circle but may be moved to or from the waste heat boiler along a straight line or in any other suitable manner. It is obvious that the relative arrangement of the converter plants in top plan is such as to enable tilting the converters and pouring the liquid metal, e. g., owing to a staggered arrangement. Finally a converter plant may combine several individual converters each of which is in another phase of operation (blowing, discharging or charging). In the embodiment according to Fig. 3 more than two converters may be arranged in a circle below the waste heat boiler. Washing the gases may be effected in any form, if desired by using the steam generated in the waste heat boiler. It is pointed out that when the installation is operated with several converters and an additional heating plant parts of the installation may be cleaned and repaired without disturbing the overall operation. In the embodiment according to Fig. 2 not only three but four converters may be used to advantage. The converters not blowing may be placed on sidings. It is pointed out particularly that where a gas washing plant (wet cleaning) is used the cooling of the gases in front of that plant in the waste heat utilization apparatus reduces the consumption of washing liquid, which is another advantage. Obviously it is possible to use for this purpose not only a waste heat utilization apparatus, e. g. a waste heat boiler, but any desired cooling plant for gases or waste gases.

I claim:

1. In a converter installation, in combination, a stationary heat exchanger having inlet means for gases to be cooled in said heat exchanger; a support; a plurality of converters each having a gas discharge opening mounted on said support; means for moving said support with said converters thereon into successive positions wherein said gas discharge openings of each of said converters, respectively, face said inlet means, whereby each of said converters may be moved during its period of operation into a position whereby said gas discharge opening of said converter faces said inlet means so as to permit discharge of hot waste gases formed during operation of said converter through said gas discharge opening and said inlet means into said heat exchanger, thus intermittently supplying during successive operation of said converters a stream of hot waste gases to said heat exchanger; gas cleaning means operatively connected to said heat exchanger for cleaning waste gases cooled in said heat exchanger; and burner means communicating with said inlet means for burning a combustible mixture therein during said moving of said support with said converters thereon from one position to the next successive position, whereby said converters and burner means cooperate to supply hot gases continuously to said heat exchanger.

2. In a converter installation, in combination, a stationary heat exchanger having inlet means for gases to be cooled in said heat exchanger; support means including a circular base movable about a given axis; a plurality of converters each having a gas discharge opening mounted on said base equidistant from said axis, respectively; means for moving said base with said converters thereon about said axis into successive positions wherein said gas discharge openings of each of said converters, respectively, face said inlet means, whereby each of said converters may be moved during its period of operation into a position whereby said gas discharge opening of said converter faces said inlet means so as to permit discharge of hot waste gases formed during operation of said converter through said gas discharge opening and said inlet means into said heat exchanger, thus intermittently supplying during successive operation of said converters a stream of hot waste gases to said heat exchanger; and burner means communicating with said inlet means for burning a combustible mixture therein during said moving of said support with said converters thereon from one position to the next successive position, whereby said converters and burner means cooperate to supply hot gases continuously to said heat exchanger.

References Cited in the file of this patent
UNITED STATES PATENTS

| | | |
|---|---|---|
| 725,114 | Thomson | Apr. 21, 1903 |
| 1,195,521 | Snyder | Aug. 22, 1916 |
| 1,839,927 | Neuhauss | Jan. 5, 1932 |
| 2,066,665 | Baily | Jan. 5, 1937 |
| 2,213,052 | Rosencrants et al. | Aug. 27, 1940 |
| 2,336,833 | Badenhausen | Dec. 14, 1943 |